United States Patent

Lynn

[11] Patent Number: 5,429,324
[45] Date of Patent: Jul. 4, 1995

[54] SPLIT EXHAUST JET BLAST DEFLECTOR FENCE

[76] Inventor: B. Stanley Lynn, Pajaro Dunes, H-11, Watsonville, Calif. 95076

[21] Appl. No.: 120,546

[22] Filed: Sep. 14, 1993

[51] Int. Cl.⁶ ............................................. B64F 1/26
[52] U.S. Cl. ................................ 244/114 B; 181/210
[58] Field of Search .................... 244/114 B, 114 R; 181/210, 218; 256/12.5, 24, 25, 26, 1, 73

[56] References Cited

U.S. PATENT DOCUMENTS

| | | | |
|---|---|---|---|
| 2,826,382 | 3/1958 | Hayden | 244/114 B |
| 2,936,846 | 5/1960 | Tyler et al. | 244/114 B |
| 3,080,937 | 3/1963 | Garbell | 244/114 B |
| 3,386,528 | 6/1968 | Kurtze | 181/218 |
| 4,471,924 | 9/1984 | Lynn | 244/114 B |
| 5,127,609 | 7/1992 | Lynn | 244/114 B |

Primary Examiner—William Grant
Attorney, Agent, or Firm—William W. Burns

[57] ABSTRACT

A jet blast deflector fence comprising two curved corrugated deflecting surfaces separated from each other in a common structural framework that is fastened to a concrete foundation, with the taller front deflecting surface open at the bottom to permit the high speed jet exhaust ground layer component to split off and pass through the opening to impinge upon the shorter rear deflecting surface which deflects that component vertically upward to hug the convex rear surface of the front deflector, while the upper slower moving component of the jet blast is guided upwardly by the concave surface of the front deflecting surface such that the two split layers come together in a substantially vertical direction at the discharge edge of the taller deflecting surface to form a vertical air curtain which aerodynamically increases the effective height of the blast deflector.

4 Claims, 4 Drawing Sheets

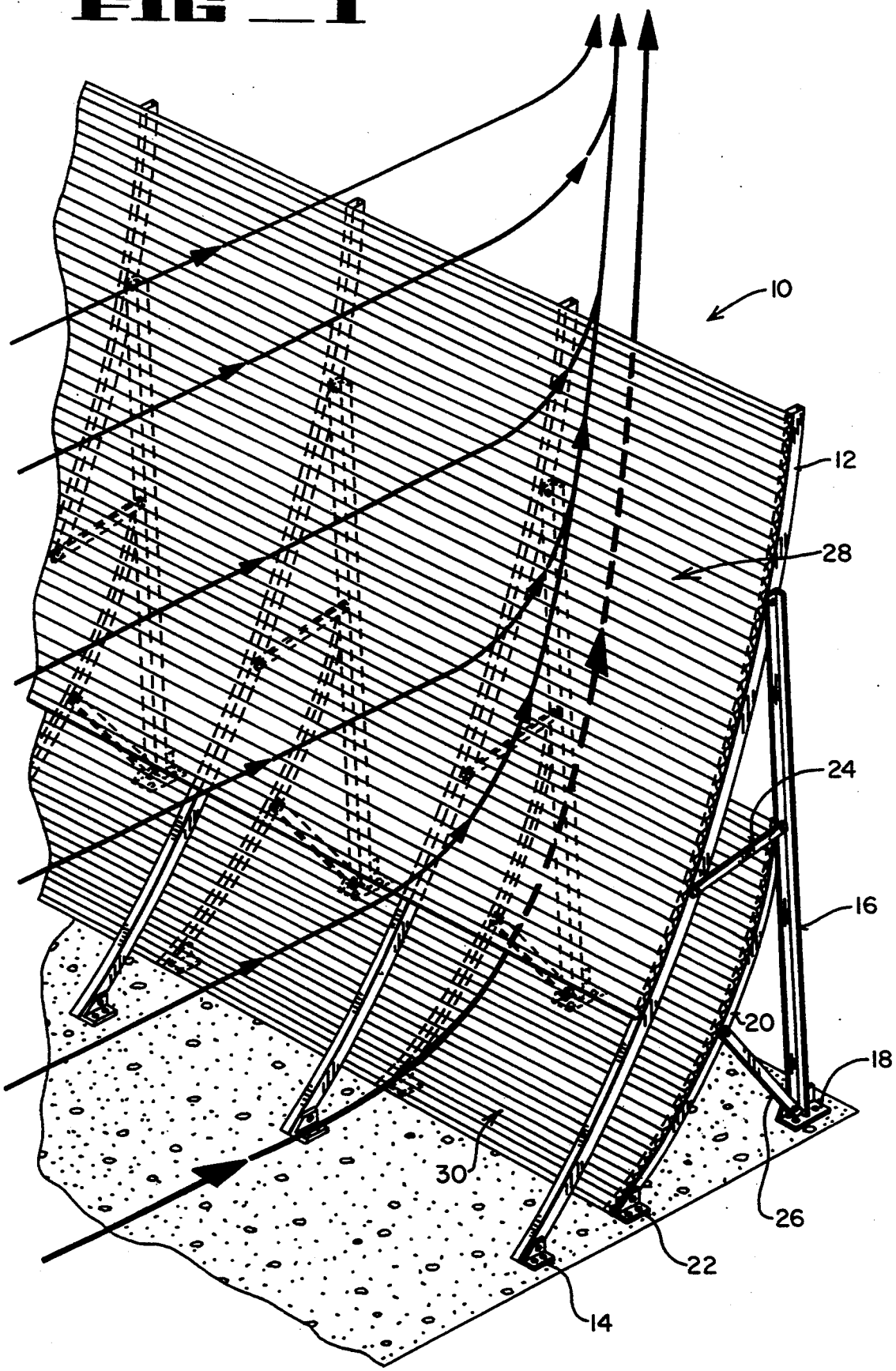
FIG_1

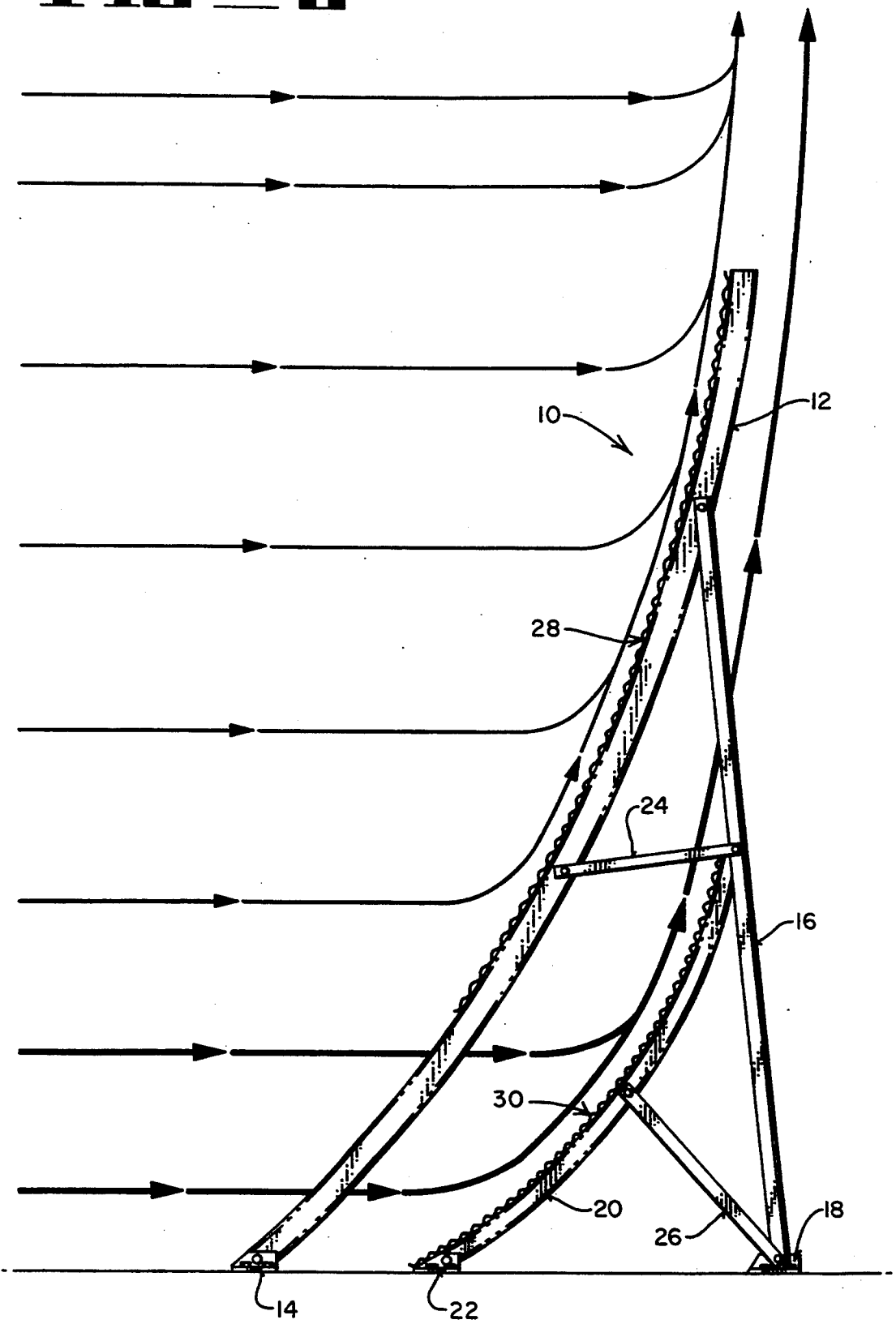

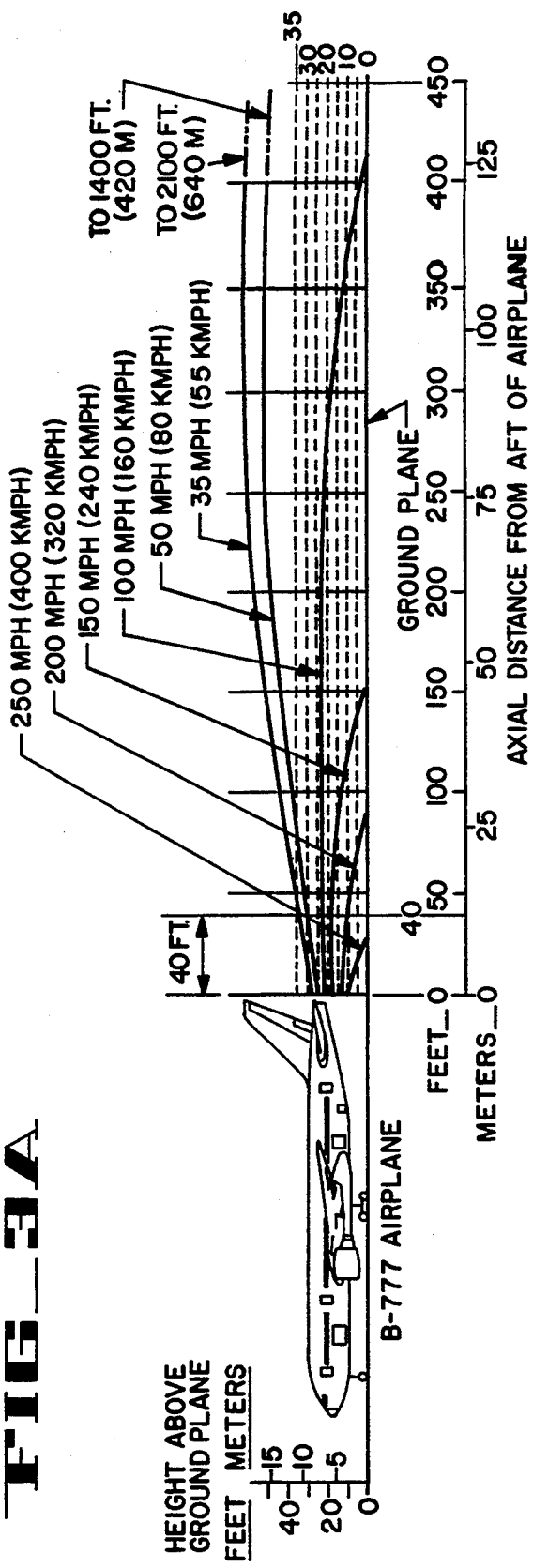
FIG_3A
FIG_3B

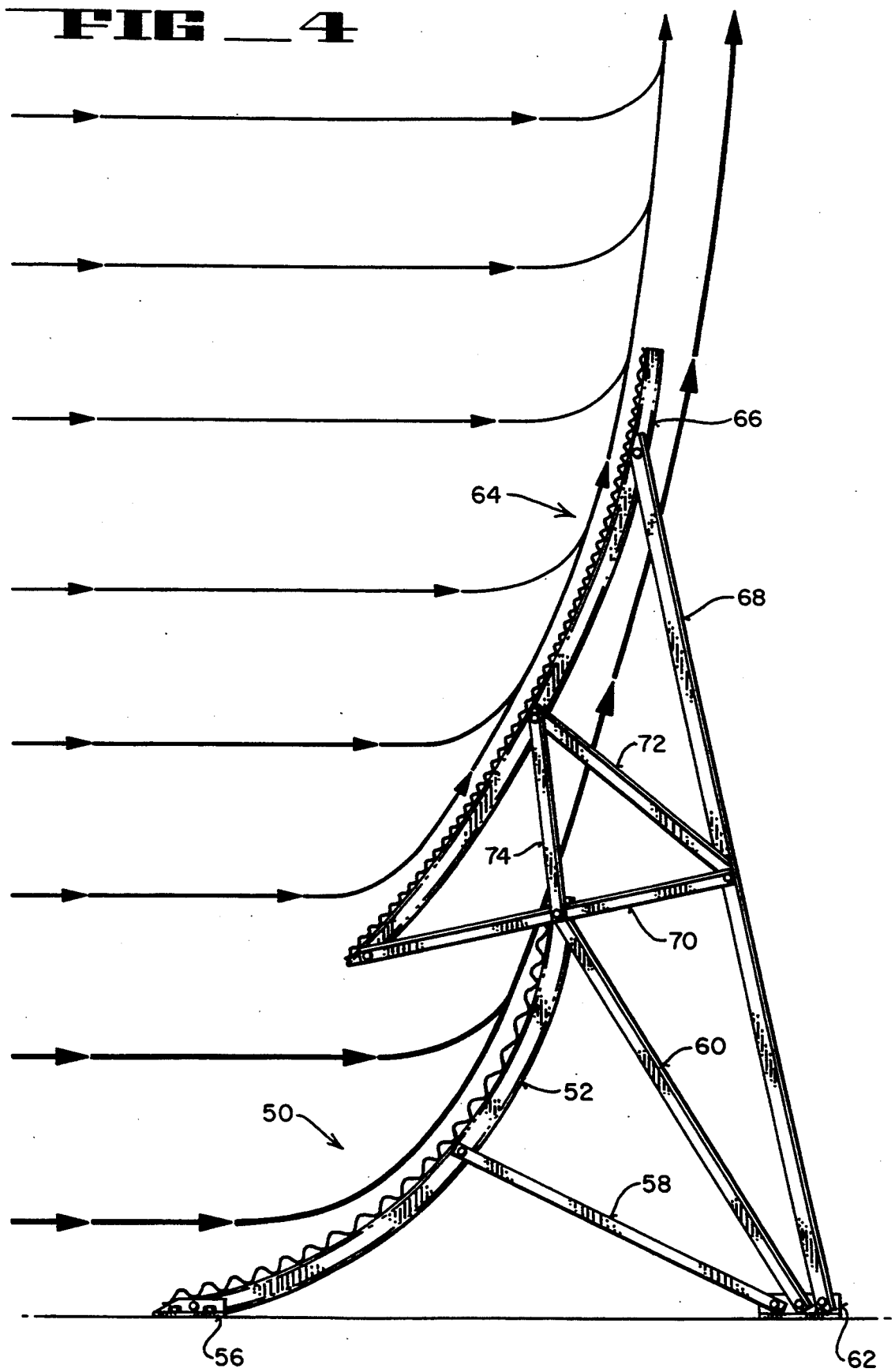

SPLIT EXHAUST JET BLAST DEFLECTOR FENCE

BACKGROUND OF THE INVENTION

1. Field of the Invention

The present invention relates to jet blast deflection fences for upwardly deflecting the blasts of various types of jet and turbo prop aircraft and more particularly the present invention pertains to a new and improved fence which splits or divides the jet blast into higher velocity components that move close to the airport surface and upper components of lower velocity, the higher velocity components moving at more than twice the speed of the upper remaining components to form a barrier or wall that guides the remaining components of the blast upward, thereby increasing the ability or capacity of the jet blast deflector fence to handle the tremendously increased volume of gases from the new super-thrust engines such as the GE-90 for the Boeing 777, which produces a blast of 100,000 pounds or more jet blast deflector, which is necessary to protect personnel, other aircraft, and other property at military and public airports from the horizontal jet blast which is composed of hot gases and particles of debris which have been accelerated to high velocities.

2. Description of the Prior Art

Early blast fences were fairly simple in structure and usually no more than eight (8) feet in height. As larger aircraft with greater thrust appeared, taller fences with more complex supporting structures were required. For example, blast deflector systems for the Douglas DC-10 and MD-11 aircraft for takeoff power engine runup and testing have now reached thirty-five (35) feet in height. At least two newer and larger jet transports are now undergoing development. The Boeing 777 and the Airbus 610 will be making their appearance at the world's airports in the next few years. These new aircraft will produce greater thrust (more than 100,000 pounds thrust per engine) than aircraft presently in use and will require larger jet blast deflectors to deflect a greater mass of hot, high velocity jet exhaust. Note that thrust is the product of mass of gas times velocity (T=MV) so to obtain 100,000 pound thrust requires twice the volume of exhaust gas as compared with a 50,000 pound thrust # T engine for equal velocities. Larger, stronger, and more expensive blast fences are required to handle this doubled volume.

With the increase in height of jet blast deflectors there has been an attendant increase in the width of support structure and also increased use of expensive airport apron space to support the deflector fences. There has also been an increase in cost of blast deflectors as the deflectors are increased in height. The average and most used height of deflector fences is currently fourteen (14) feet as opposed to the eight (8) foot height of fences that were required for the Boeing B-52 twenty-five to thirty years ago. As the Boeing 777 and Airbus 610 are introduced the average height of fences will increase to possibly twenty-one (21) to thirty (30) feet. And with the increases in height more valuable airport apron space will be committed to use for blast fence structure and support.

The improvements embodied in the present invention address and alleviate the problems created by newer jet aircraft such as the Boeing 747, 767, 777, and Airbus 610 and particularly the Douglas MD-11 the Number 2 engine of which is already 32 feet above the pavement, which have higher trust engines that produce larger volumes of hot, high velocity gas. The MD-11 may require a fence 50 feet in height.

The present invention presents a shorter, less costly blast fence that has the effective blast deflector capability of larger blast fences. Coupled with the reduction in size of the blast deflector fence of the present invention is a reduction in the cost of structure and airport apron space necessary to support the fence.

While the inventor knows of no prior art patents which incorporate the theory and effect of the present invention, prior blast deflectors have included two or more separate blast deflection surfaces in the same fence. Most notably the jet blast deflecting fence described in the U.S. Pat. No. 4,471,924 issued to B. S. Lynn, Sep. 18, 1994 includes two (2) blast deflection surfaces separated by a slot. That Patent does not teach any of the objects of the present invention.

SUMMARY OF THE INVENTION

The general purpose of the present invention in its preferred embodiment which will be described subsequently in greater detail, is to provide a new and improved jet blast deflector fence which is composed of two (2) curved deflectors, a front, taller deflector surface, and a rear, shorter deflector surface. Both of the deflector surfaces are supported by the same support structure. The front deflector surface includes an opening between the surface of the apron and the leading edge of the deflector surface that is approximately one-quarter of the height of that deflector surface. The opening allows passage of and separates the highest velocity component of the jet blast and directs it to the concave forward surface of the rear deflector, the leading edge of which is at ground level. The concave rear surface guides the higher velocity components of the jet blast from a horizontal to a vertical direction. The higher velocity components then move into contact with the convex rear surface of the taller deflector. By means of the Coanda effect the higher velocity components of the jet blast follow the rear surface to the trailing edge of that surface. At that point the higher velocity components combine to accelerate lower velocity elements of the blast that have been deflected by the front deflector surface and forms a barrier to other slower moving components of the blast.

To obtain these advantages, the present invention requires a simple supporting structure composed of a series of support frames, that are each comprised of a first or front curved support member or rib, a second or rear curved support member or rib, and an upright support member. A series of corrugated panels are bolted to the face of the series of first curved support members starting at approximately one-quarter of the height of the first ribs to form a continuous first blast deflecting surface. The leading edge of the panels define an opening with the surface of the apron. And similarly a series of corrugated panels is bolted to the curved face of the second series of curved support members or ribs to form a second continuous deflection surface. The leading edge of the second surface commences at the surface of the apron. The first and second deflecting surfaces combine to form a confined channel which separates the highest velocity component of the blast which is lower to the ground, guides it through the channel and redirects it along the backside of the front or first deflecting surface. The high velocity components combine at the trailing edge of the first deflecting surface with slower components that have been deflected by the first surface, impart an acceleration to the slower components and further combine to create a barrier or wall of higher velocity air which prohibits passage by the remaining components of the blast.

There has thus been outlined rather broadly, the important features of the present invention in order that the detailed description thereof that follows may be better understood, and in order that the present contributions may be better appreciated. There are, of course, additional features of the invention that will be described hereinafter plus other embodiments all of which will form the subject matter of the claims appended hereto. Those skilled in the art will appreciate that the concept, upon which this disclosure is based, may readily be utilized as a basis for designing of other structures for carrying out the several purposes of the present invention. It is important, therefore that the claims be regarded as including such equivalent construction so far as they do not depart from the spirit and scope of the present invention.

As such it is an object of the present invention to provide a new and improved jet blast deflector fence which has all of the advantages of the prior art jet blast deflector fences and none of the disadvantages.

It is another object of the present invention to provide a new and improved jet blast deflector fence which may be efficiently and easily manufactured and marketed, and installed, and the components of which are easily transported to the far corners of this world.

It is a further object of the present invention to provide a new and improved jet blast deflector fence that may be simply efficiently, and reliably assembled.

It is a still further object of the present invention to provide a new and improved jet blast deflector fence to split the jet blast into higher and lower velocity components and to utilize the higher velocity component as a barrier that is impervious to the lower velocity components.

It is an additional object of the present invention to use the blast itself to assist in blast deflection, an effect which reduces the height and cost of the blast fence required to handle the tremendous exhaust gas volumes of the newest jumbo jet engines.

Still another object of the present invention is to provide a new and improved jet blast deflector fence that is of durable and rugged construction yet which is less costly to construct than existing fences.

Even another object of the present invention is to provide a new and improved means for modification of existing jet blast deflector fences that will allow existing fences to split the jet blast into several components in order to be utilized for newer and larger aircraft with the new super-engines now being developed, such as the new GE 90.

Still yet another object of the present invention is to provide a new and improved jet blast deflector fence which uses less airport apron space resulting in the creation of more useable area on the overcrowded and very expensive aprons.

And even yet another object of the present invention is to provide a new and improved jet blast deflector fence that eliminates the bounce back of the blast into the airplane, thus reducing possibility of Foreign Object Damage (F.O.D.) which can ruin the engines.

An even further object of the present invention is to provide a new and improved jet blast deflector fence which provides in the apparatuses and methods of the prior art some of the advantages thereof while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 1 is a front perspective view of the jet blast deflector fence of the preferred embodiment.

FIG. 2 is an end view of the jet blast deflector fence of the Preferred Embodiment.

FIG. 3A is a graphical presentation of the Jet Wake Velocity Contours for the Boeing 777 Airplane.

FIG. 3B is a chart of velocity contours of the jet wake of a B-777 as a function of height above ground and distance from tail.

FIG. 4 is an end elevation of an alternate configuration of the Preferred Embodiment.

DESCRIPTION OF THE PREFERRED EMBODIMENT

Referring to FIG. 1 and 2, the elements of the split exhaust jet blast deflector fence 10 are well disclosed. In the preferred embodiment the split exhaust jet blast deflector fence is comprised of a series of spaced support frames or deflector support frames which are anchored to the concrete apron of an airport. (For high thrust large airplanes such as the B-777 or B-747, the support frames are spaced three (3) feet apart. For lesser thrust airplanes or for light "brakeaway" duty the support frames would be spaced as much as six (6) feet apart.)

The support frames include a first concave curved front rib or channel or structural member 12 that is comprised for example of standard five (5) inch steel channel that has been rolled such that the outer edge of the channel flanges form the fore and aft edges of the curve. At its lower end the front rib or channel 12 is pivotally bolted to the vertical leg of a front anchor clip 14. The horizontal leg of the clip is bolted by means of two (2) spaced cap screws to Hilti anchors which are installed in drilled holes in the concrete of the airport apron.

Near its upper end the rib or channel 12 is rigidly bolted to the upper end of an upright main strut or structural member 16. At its lower end the strut or post 16 is bolted to the vertical leg of a rear clip 18. The horizontal leg of the rear clip 18 is bolted to the apron by means of two (2) spaced cap screws that mate with Hilti expansion anchors that have been installed in drilled holes in the concrete apron. The strut 16 is comprised of angle iron.

A second concave curved rib or channel or structural member 20 located to the rear of the rib 12 is pivotally secured at its lower end to a front clip 22. The horizontal leg of the clip 22 is bolted to the apron by means of spaced cap screws mated to Hilti anchors installed in drilled holes in the apron. Near its upper end the rib 20 is bolted to the strut 16. Angle iron cross braces 24 and 26 are added to the support frames when the Blast Deflector is used to deflect the blast from high thrust airplanes, such as the Boeing 747, the Boeing 777, or the MD-11. It is significant that the rear strut 16 is constrained from moving or bending either fore-and-aft or from side-to-side. This eliminates the need for additional external bracing.

A first and forward deflector surface 28 is created by a series of galvanized corrugated metal sheets or corrugated deflector surface means that are bolted to the concave front surfaces of the ribs 12. The corrugated panels are approximately two (2) feet in width. With a fence of 20 foot height that could be used to deflect the blast from a Boeing 777 airplane the first of the series of corrugated panels would commence at an elevation of five (5) feet above the airport apron and continue with sheets butted in turn one to the next to cover the upper portion of the ribs 12. The sheets are bolted to the ribs by means of bolts and curved washers which mate with the curved surface of the valleys of the corrugated panels. With the commencement of the deflection surface at the five (5) foot elevation the lower edge or leading edge of the first panel, the apron and the ribs 12 define an opening below the deflection surface.

A second or rear deflector surface or fence 30 is similarly created by a series of galvanized corrugated metal sheets or panels or corrugated deflector surface means that are bolted to the curved ribs or channels 20. The panels overlay the concave front faces of the ribs 20 from the lower ends of the ribs to the upper ends thereof. In the present embodiment the rear blast deflector is about seven plus (7+) feet in height. The leading edge of the rear deflector commences at the surface of the apron.

Reference is now made to FIG. 3A which graphically displays the jet wake velocity contours of the engine thrust at takeoff setting (84,600 lbs.) for the Boeing 777 Airplane (B-777). Data from the graph is tabulated in the accompanying Chart (FIG. 3B). It can be seen by a review of FIGS. 3A and 3B that the layer of jet exhaust closest to the plane of intersection at ground level is moving at a much higher velocity than the upper portion of the blast envelope. It is the difference in velocities of the lower and upper components of the exhaust that is the essence of the novelty in the design of the present invention. It is the intent and ability of the present invention to split off the highest velocity component, designated herein and in FIG. 3B as V1. That component is traveling between the ground surface and five (5) foot elevation according to FIG. 3A and the chart of FIG. 3B.

In operation the split exhaust jet blast deflector fence of the present invention would be utilized during run up or take off at a position approximately forty (40) feet behind the aircraft. The highest velocity component designated V1 will pass through the opening in the front fence and impinge upon the curved concave forward surface of the rear fence. The jet blast component V1 will be deflected by the corrugated curved surface of the rear fence from a horizontal course to a vertical direction. As the component V1 moves along the surface 30 it is guided slightly forward at the trailing edge of the surface 30 into contact with the rear convex surface of the front fence. The blast component V1 will then be guided along in contact with the rear convex surface of the front fence to a vertical direction by the Coanda effect, the phenomena according to which a stream of gas traveling at high speed will hug a convexly curved surface (the rear face of the front blast deflector) and will be guided thereby in the desired direction, vertically in this instance.

The upper jet exhaust component which is designated V2 will for the most part impact the first or forward deflector surface and be directed upwardly. As the component V2 leaves the discharge or trailing edge of the front deflector surface it is contacted by the component V1, which imparts an upward acceleration to the component V2. The combined components V1 and V2 create an air curtain that is moving vertically. It is significant to note that the ratio V1/V2 for the B-777 Airplane is 2.27. The air curtain that is created is substantially impervious to the remainder of the blast envelope which is moving at significantly lower velocity (See FIG. 3A).

FIG. 4 illustrates an alternate embodiment of the present invention. This embodiment effects similar results to those of the preferred embodiment with a variance in structure. The blast deflector of this embodiment includes a first or lower fence 50 that is comprised of a series of spaced support structures each of which include a curved rib 52 formed of steel channel that has been rolled to form a curve such that the outer edges of the channel flanges form the fore-and-aft edges of the curve. At its lower end the rib 52 is pivotally connected to the upright leg of a front anchor clip 56. The horizontal leg of the clip 56 is bolted to Hilti anchors which are installed in drilled holes in the concrete airport apron. The rib 52 is held rigidly in place by means of two (2) angle iron struts 58 and 60 which are bolted at their upper ends to the rib 52. The struts 58 and 60 are bolted at their lower ends to the upright leg of a rear clip 62. The deflection surface is formed by a series of corrugated metal panels butted edge to edge which are bolted to the concave surface of the ribs. In this embodiment, wherein the blast fence is designed for higher thrust airplanes such as the B-747 or B-777, the upper end of the lower fence 50 is at an elevation of nine (9) feet above the payment.

Interconnected to the upper end of the lower fence 50 is an upper fence 64. The upper fence 64 is comprised of a series of curved ribs or steel channel members 66 which are supported firstly by the upright angle iron strut 68 which is bolted at its upper end near the upper end of rib 66. The strut 68 is bolted at its lower end to the upright leg of the rear clip 62. The rib 66 is further supported by the cross brace 70 which is bolted at one end to the lower end of the rib or channel 66. The brace 70 is further bolted to the upper end of the channel 66 and then at its other end to the strut 68. Further supporting the rib 68 are other cross-members 72 and 74. Cross-member 72 is bolted at one end near the midpoint of rib 66 and at its other end to the strut 68. Cross-member 74 is joined with cross-member 72 at the midpoint of the rib 66 and also to the brace 70 at the upper end of rib 52.

The deflection surface of the upper fence is formed of a series of corrugated metal panels butted together and bolted to the ribs 66. The panels extend from the bottom of the ribs at an eight (8) foot elevation to the upper end of the ribs twenty-one (21) feet above the pavement.

In use this embodiment of the blast deflection fence performs in similar fashion to the deflection fence of the preferred embodiment. The higher velocity component V1 of the blast is deflected from a horizontal heading to a vertical heading by the lower fence 50. As that component V1 of the blast leaves the trailing edge of the lower fence the component may be directed slightly forward against the rear surface of the fence 64. The Coanda effect which has been described previously herein causes the component to follow the rear of the fence 64 to a vertical heading. As the component V1 leaves the trailing edge of the fence 64 it mixes with and accelerates the slower moving component V2 of the blast and the two components thereby form a barrier to the slower moving components of the blast.

With respect to the above description then, it is to be realized that the optimum dimensional relationships for the parts of the invention to include variations in size, materials, shape, configuration, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principle of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A new and improved jet blast deflector fence of the type that is secured to an airport apron to deflect the jet blast from jet aircraft, said fence consisting of a deflector support frame means, a first, forward deflector surface, and a second rear deflector surface, wherein:

(a) said deflector support frame means is comprised of three (3) structural members, a first member comprising a concave curved steel channel fastened at its lower end to the apron by front clip means that is bolted to the apron, a second member comprising an upright post, the upper end of the post being fastened to the first member near the upper end of said first member, the lower end of said post being fastened to the apron by rear clip means that is bolted to the apron, a third member comprising a concave curved steel channel, horizontally spaced to the rear of said first member, fastened at its lower end to the apron by front clip means, the upper end of said third member being fastened to the second member below the upper end of said first member;

(b) said first, forward deflector surface is formed by first corrugated deflector surface means secured to said first member, the first corrugated deflector surface means commencing from a point that is elevated from the apron and continuing to the upper end of said first member;

(c) said second, rear deflector surface is formed by second corrugated deflector surface means secured to said third member, said second corrugated deflector surface means commencing at the lower end of said third member and continuing to the upper end of said third member; and, (d) the first, forward deflector surface has a rear convex surface and the second, rear deflector surface has a forward concave surface, the rear convex surface and the forward concave surface combining to define a confined channel, said second, rear deflector surface deflecting higher velocity components of the jet blast upward through the confined channel to create a wall of higher velocity components of the jet blast that is impermeable by lower velocity components of the jet blast that are deflected by the first, forward deflector surface.

2. A jet blast deflector fence, installed on an airport apron surface, said fence consisting of a support frame for support of the jet blast deflector fence, a curved forward deflector surface spaced vertically from the apron surface and attached to the support frame and a curved rear deflector surface attached to the support frame and commencing at the surface of the apron, the rear deflector surface being spaced horizontally from the forward deflector surface said forward deflector surface having a rear convex surface, said rear deflector surface having a concave forward surface, the rear convex surface of said forward deflector surface and the concave forward surface of said rear deflector surface cooperating to define a confined channel, said rear deflector surface deflecting higher velocity components of the jet blast that travel close to the apron surface upwards through the confined channel in contact with the rear surface of said forward deflector surface to create a wall of higher velocity Components of said jet blast impermeable by lower velocity components of said jet blast.

3. The jet blast deflector fence of claim 2 wherein said vertical spacing between the forward deflector surface and the surface of the apron defines an opening for passage of the higher velocity components of the jet blast, which travel closer to the apron surface, to the rear deflector surface.

4. A jet blast deflector fence of the type that is installed on an airport apron surface to deflect the jet blast from jet aircraft, consisting of a support frame for support of the jet blast deflector fence, a curved forward deflector surface having a lower end commencing at an elevation of approximately five (5) feet above the apron surface and attached to the support frame, and a curved rear deflector surface commencing at the surface of the apron and attached to the support frame, wherein the rear deflector surface is spaced horizontally from the forward deflector surface, and wherein the lower end of the forward deflector surface and the surface of the apron define an opening for passage of the higher velocity components of the jet blast to the rear deflector surface, said forward deflector surface having a rear convex surface, said rear deflector surface having a concave forward surface, the rear convex surface of said forward deflector surface and the concave forward surface of said rear deflector surface cooperating to define a confined channel, said rear deflector surface deflecting higher velocity components of the jet blast upward through the confined channel in contact with the rear surface of said forward deflector surface to create a wall of higher velocity components of said jet blast which is impermeable by lower velocity components of said jet blast.

* * * * *